United States Patent
Knobel

(10) Patent No.: US 9,723,156 B2
(45) Date of Patent: Aug. 1, 2017

(54) APPARATUS AND METHOD FOR PROVIDING TELECOMMUNICATION SERVICES

(71) Applicant: KANFIELD CAPITAL SA, Panama (PA)

(72) Inventor: Thomas Christian Knobel, Panama (PA)

(73) Assignee: KANFIELD CAPITAL SA, Panama (PA)

( * ) Notice: Subject to any disclaimer, the term of this patent is extended or adjusted under 35 U.S.C. 154(b) by 114 days.

(21) Appl. No.: 14/559,359

(22) Filed: Dec. 3, 2014

(65) Prior Publication Data

US 2015/0156331 A1     Jun. 4, 2015

Related U.S. Application Data

(60) Provisional application No. 61/911,308, filed on Dec. 3, 2013.

(51) Int. Cl.
| | | |
|---|---|---|
| H04L 12/66 | (2006.01) | |
| H04M 15/00 | (2006.01) | |
| H04L 12/14 | (2006.01) | |

(52) U.S. Cl.
CPC ........ *H04M 15/83* (2013.01); *H04L 12/1414* (2013.01); *H04L 12/1471* (2013.01); *H04M 15/54* (2013.01); *H04M 15/58* (2013.01); *H04M 15/765* (2013.01); *H04M 15/7652* (2013.01); *H04M 15/8083* (2013.01)

(58) Field of Classification Search
None
See application file for complete search history.

(56) References Cited

U.S. PATENT DOCUMENTS

| | | | | |
|---|---|---|---|---|
| 6,636,504 | B1 * | 10/2003 | Albers | H04M 7/1225 370/352 |
| 8,019,683 | B1 * | 9/2011 | Swanburg | G06Q 20/102 370/259 |
| 8,270,944 | B1 * | 9/2012 | Gailloux | H04W 4/12 455/406 |
| 2001/0049636 | A1 * | 12/2001 | Hudda | G06Q 30/06 705/26.1 |
| 2005/0204041 | A1 * | 9/2005 | Blinn | H04L 63/0815 709/225 |
| 2007/0118604 | A1 * | 5/2007 | Costa Requena | H04L 12/581 709/206 |
| 2007/0162364 | A1 * | 7/2007 | Held | H04L 12/1403 705/34 |

(Continued)

*Primary Examiner* — Bob Phunkulh
(74) *Attorney, Agent, or Firm* — Kelley Drye & Warren LLP

(57) ABSTRACT

Methods and apparatus of improving telecommunication network efficiency by increasing user device registration with and use of the network are disclosed. Improved user device registration and use, and thus increased efficiency may be achieved by allocating revenue generated by operation of a telecommunication network between user devices, a network operator device, and a third party device. The allocation of revenue may be based, at least in part, on a hierarchical relationship between user devices registered with the network and information concerning the use of the telecommunication network by the user devices.

32 Claims, 6 Drawing Sheets

(56) References Cited

U.S. PATENT DOCUMENTS

| | | | |
|---|---|---|---|
| 2009/0076952 A1* | 3/2009 | Cadenas | G06Q 20/102 |
| | | | 705/40 |
| 2009/0149205 A1* | 6/2009 | Heredia | H04L 12/581 |
| | | | 455/466 |
| 2009/0164357 A1* | 6/2009 | Frazier | G06Q 20/04 |
| | | | 705/34 |
| 2009/0254971 A1 | 10/2009 | Herz et al. | |
| 2010/0325646 A1 | 12/2010 | Alhadeff et al. | |
| 2011/0136516 A1* | 6/2011 | Ellis | H04W 4/14 |
| | | | 455/458 |
| 2012/0197967 A1* | 8/2012 | Sivavakeesar | G06Q 50/01 |
| | | | 709/203 |
| 2013/0085936 A1* | 4/2013 | Law | G06Q 20/04 |
| | | | 705/40 |
| 2013/0212185 A1* | 8/2013 | Pasquero | G06Q 10/107 |
| | | | 709/206 |
| 2013/0268358 A1* | 10/2013 | Haas | G06Q 30/0255 |
| | | | 705/14.53 |
| 2014/0108962 A1* | 4/2014 | Olomskiy | G06Q 10/10 |
| | | | 715/753 |
| 2014/0372554 A1* | 12/2014 | Kharkar | H04L 67/1095 |
| | | | 709/217 |
| 2015/0011277 A1* | 1/2015 | Wakeford | A63F 13/00 |
| | | | 463/1 |
| 2016/0180344 A1* | 6/2016 | Studnicka | G06Q 20/425 |
| | | | 705/44 |

\* cited by examiner

| LEVEL | CREDIT A | CREDIT B |
|---|---|---|
| LEVEL 0 | 10% | 50% |
| LEVEL 1 | 5% | 10% |
| LEVEL 2 | 2.5% | 5.0% |
| LEVEL 3 | 1.25% | 2.5% |
| LEVEL 4 | 0.625% | 1.25% |
| LEVEL 5 | 0.3125% | 0.625% |
| LEVEL 6 | 0.15625% | 0.3125% |
| LEVEL 7 | 0.078125% | 0.15625% |
| LEVEL 8 | 0.0390625% | 0.078125% |
| TOTAL | 19.9609375 | 69.921875 |

*FIG. 6*

APPARATUS AND METHOD FOR PROVIDING TELECOMMUNICATION SERVICES

CROSS REFERENCE TO RELATED APPLICATIONS

This application relates to, and claims the benefit of the earlier filing date and priority of U.S. Provisional Patent Application No. 61/911,308, filed on Dec. 3, 2013, entitled "Apparatus and Method for Providing Telecommunication Services."

FIELD OF THE INVENTION

The present invention relates generally to a system and method for providing telecommunication services in which revenue generated by use of the network is allocated between end users of the network and the network operator.

BACKGROUND OF THE INVENTION

Telecommunication devices, mobile, landline or other, are increasingly used to provide communication between one or more persons. Communication using these telecommunication devices may be in the form of voice communication, text messages, instant messaging, sound (e.g., audible alerts), video, picture, or multi-media information. Voice communication may be with one person or with more than one person in the form of a three-way call or a conference call. Text, audible, picture, video, and multi-media information may also be sent to one person or more than one person using the multiple address function that is common in telecommunication devices.

For voice communication, the caller may dial a number from his telecommunication device and the call may be routed through the telecommunication network to the recipient's telecommunication device. Alternatively, the call may be routed through the Internet, or a combination of the Internet and the telecommunication network. The recipient's telecommunication device may inform the recipient through events such as an audible alert, vibration, visual indicator or some other means, or combination of visual, tactile and audible signals, of the incoming call. Once aware of the incoming call, the recipient may choose to receive the call and communicate with the caller, or may choose to ignore the call. Likewise, the caller may send a message in the form of a text message, picture, audio file or indicator, video recording, or other multimedia content to one or more recipients. These messages may be routed through the telecommunication network and/or the Internet to the recipient's telecommunication device. The recipient's telecommunication device may alert the recipient of the incoming message, and the recipient may view and respond to the incoming message or may choose to view them later at a convenient time.

All of these modes of communication require the caller to send a voice, audible, text, video, picture, or multimedia message, which are then delivered to the recipient. The operator(s) of the one or more networks used to carry these communications (e.g. carriers) typically charge end users, in one form or another, for use of the network. These charges may be in the form of flat monthly fees, per call fees, calling card purchases, or the like. The cost of building, maintaining and operating these telecommunication networks can be significant. The per call or per caller costs to operate a network may be reduced or minimized by increasing or maximizing the use of the network, or in other words, by increasing or maximizing the number of end users or subscribers who use the network. Therefore, there is a need for a telecommunication system and network which operates in a manner that facilitates and encourages increased use of the network by end users.

Specifically, there is a need for automatically increasing the number of user telecommunication devices which are registered for use with, and use, a telecommunication network. Increased network usage may improve network efficiency by optimizing the number of network user devices for a network having a given capacity for handling user device traffic. It is appreciated that the computer administered incentive system provided by embodiments of the present invention may increase user device registration and use of a network, thereby resulting in increased network efficiency. Further, there is a need for a method of operating a telecommunication network more efficiently. It is appreciated that the computer administered incentive methods provided by embodiments of the present invention may also increase user device registration and use of a network, thereby resulting in increased network efficiency.

SUMMARY OF THE INVENTION

Responsive to the foregoing challenges, Applicants have developed a method for improving telecommunication network operational efficiency for a telecommunication network connecting a server and client side telecommunication devices, the method comprising: providing a server to communicate with first and second telecommunication devices; registering the first and second telecommunication devices with the server; determining, at the server, a hierarchical relationship between the first and second telecommunication devices; storing, in a computer memory associated with the server, an indicator of the hierarchical relationship of the first and second telecommunication devices; storing, in the computer memory, information concerning use of the telecommunication network by the second telecommunication device; determining an end user credit for the first telecommunication device based at least in part on the indicator of the hierarchical relationship of the first and second telecommunication devices, and based at least in part on the information concerning the use of the telecommunication network by the second telecommunication device; and transmitting a signal to the first telecommunication device and/or other computer associated with the first telecommunication device based on the determined end user credit, said signal being adapted to produce a physically perceptible output of the determined end user credit.

Applicants have further developed a method for improving telecommunication network operational efficiency for a telecommunication network connecting a server and client side telecommunication devices, the method comprising: providing a server to communicate with first, second and third telecommunication devices; registering the first, second and third telecommunication devices with the server; determining, at the server, a hierarchical relationship between the first and second telecommunication devices; determining, at the server, a hierarchical relationship between the second and third telecommunication devices; storing, in a computer memory associated with the server, an indicator of the hierarchical relationship of the first and second telecommunication devices and an indicator of the hierarchical relationship of the second and third telecommunication devices; storing, in the computer memory, information concerning use of the telecommunication network by the third telecommunication device; determining an end user credit for the first telecommunication device based at least in part on the indicator of the hierarchical relationship of the first and second telecommunication devices, based at least in part on the indicator of the hierarchical relationship of the second and third telecommunication devices, and based at least in part on the information concerning the use of the telecommunication network by the third telecommunication device; and transmitting a signal to the first telecommunication device and/or other computer associated with the first telecommunication device based on the determined end user credit, said signal being adapted to produce a physically perceptible output of the determined end user credit.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

FIG. 6 is an illustration of the variation of end user credits that may be determined in accordance with embodiments of the invention.

DETAILED DESCRIPTION OF EMBODIMENTS OF THE INVENTION

The various methods discussed herein may be implemented between telecommunication devices that are connected through a telecommunication network or over the Internet. One skilled in the art will recognize that the present invention can be implemented using any type of communication device, including but not limited to conventional telephones, wireless telephones, cell telephones, pagers, personal digital assistants (PDAs), personal communication devices, PDAs, smart phones, or any communication device capable of transmitting and receiving information, including, for example, handheld email devices, handheld computers, desktop computers, laptop computers, and the like. Accordingly, any particular structure and design of the telecommunication devices is merely one example of a physical device for implementing the techniques of the present invention, and is referred to for illustrative purposes and not to imply any limitations on the scope of the present invention. To the extent that embodiments of the present invention require electronic components and circuits, which are generally known to those skilled in the art, circuit details are not specified in order to not distract from the teachings of the present invention.

The telecommunication devices may each include a screen, which may be a liquid crystal display (LCD), or other type of display for presenting output to the user, including representations of dialing buttons, menus, and the like. The telecommunication device may also include one or more mechanisms for accepting input from the user. In one embodiment, the screen is touch-sensitive, so that the user may interact with the telecommunication device by touching or writing on the surface of screen using a stylus, finger, or other object. Touch screens may receive inputs other than those used to select numeric or text symbols. For example, a touch screen may be rubbed or received a patterned tactile input. In another embodiment, in addition to, or as a surrogate for, the touch-sensitive screen, the telecommunication device may also include a QWERTY keyboard, or any other type of keyboard or button based interface, for enabling rapid entry of an input, including text, and may further include buttons for performing various other functions associated with the operation of the telecommunication device and its applications.

Figure 1:
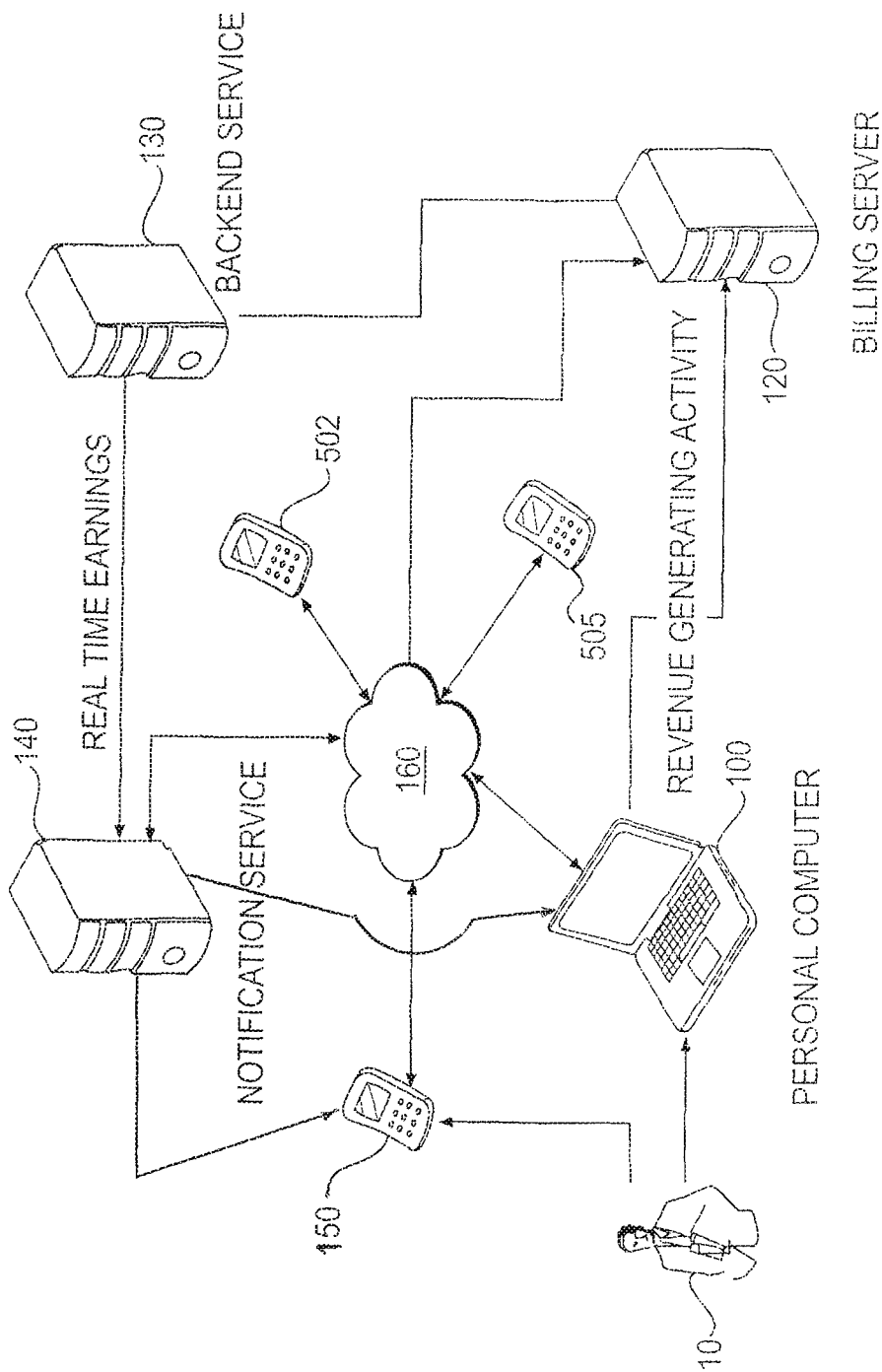
FIG. 1 is a schematic illustration of a system including a telecommunication network and multiple telecommunication devices in accordance with embodiments of the present invention.

Reference will now be made in detail to a first embodiment of the present invention, an example of which is illustrated in the accompanying drawings. A system that may be used to provide the method embodiments of the present invention is illustrated in FIG. 1. With reference to FIG. 1, the system may include a computer device 100 having user input capability and a display. The computer 100 may be associated with a user 10 and a first telecommunication device 150. The computer may communicate directly or indirectly over one or more telecommunication links with one or more network operator servers, including a billing server 120, a backend server 130 and a notification server 140. In alternative embodiments, the number of servers may be reduce or expanded, so long as the services required are provided by the group of servers. The Internet may provide the required telecommunication links.

A telecommunication link also may be provided between the notification server 140 and the first telecommunication device 150, as well as between the notification server and the second telecommunication device 170. The first telecommunication device 150, the second telecommunication device 170 and the third telecommunication device 180 may be connected by one or more telecommunication networks 160. The telecommunication network 160 may facilitate voice, pictorial, video, SMS, and/or other data communication between the telecommunication devices connected thereto.

Figure 2:
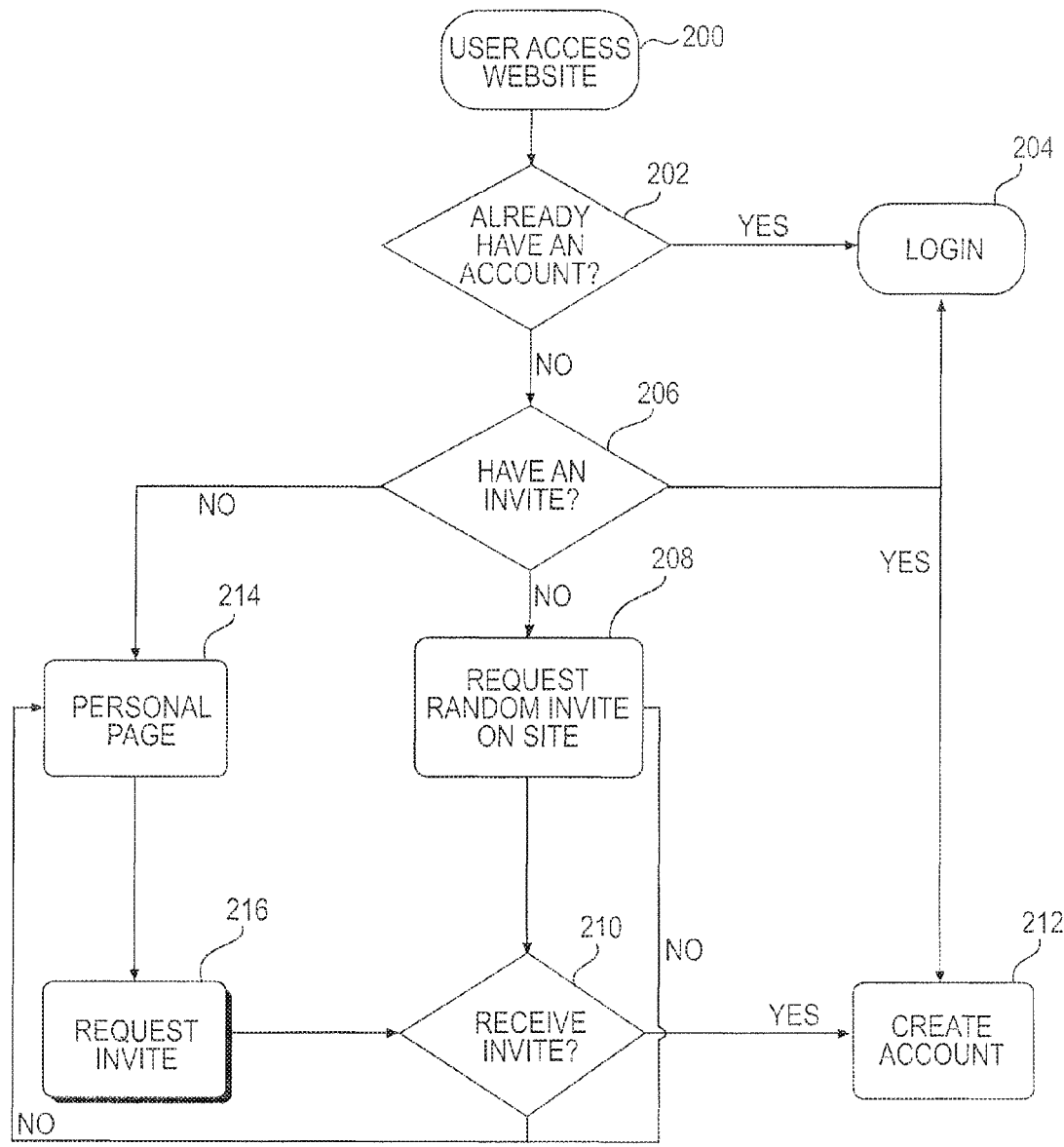
FIG. 2 is a schematic illustration of a method for registering telecommunication devices with a server in accordance with embodiments of the present invention.

FIG. 2 illustrates an exemplary method of registering the first, second and third telecommunication devices 150, 170 and 180, with one or more of the network operator servers 120, 130 and 140, shown in FIG. 1. With reference to FIG. 2, in step 200, the users may use their respective telecommunication devices and/or associated computer(s) 100 (shown in FIG. 1) to access a website associated with the network operator. In step 202, one of the servers associated with the network operator may determine from a computer memory whether there is an account already associated with the particular telecommunication device. If an account is determined to already exist, the server may transmit login information to the first telecommunication device and/or computer associated with the first telecommunication device in step 204, for logging in to the network as a registered user.

If no account exists, in step 206, one or more of the network operator servers may determine if an invite to become part of a user network was sent to and/or received by the first telecommunication device from an account associated with a different telecommunication device. If an invite had been sent or received, the server may transmit information to the first telecommunication device or associated computer to create a new account for the first telecommunication device in step 212. After the creation of the new account, the first telecommunication device or associated computer may be used to log in to the network as a registered user in step 204.

When an account is created for the first telecommunication device as a result of an invite from another telecommunication device, an indicator of a hierarchical relationship between the first telecommunication device and the telecommunication device from which the invite was received is stored in a computer memory associated with one or more of the network operator servers 120, 130 and 140.

For example, with reference to FIG. 5, if the telecommunication device from which the invite is represented as device 500, then the first telecommunication device may be represented as device 502, which is one hierarchical level below (Level 1) device 500. All devices which register as a result of an invite from device 500 will be part of Level 1 with respect to their hierarchical relationship to device 500. And all of the devices which populate Level 1 through Level 8 below device 500 (e.g., devices 502, 504 and 508) will be part of the user network 520 for device 500.

With renewed reference to FIG. 2, if it is determined in step 206 that no invite has been sent to, or received by, the first telecommunication device, the user may use the first telecommunication device or associated computer to request an invite to join a user network in one of two ways. In a first method of joining the network, in step 208, the first telecommunication device may be used to request an invite to be associated hierarchically with a random telecommunication device that is already a member of a user network, such as user network 520 in FIG. 5. The random telecommunication device may be selected by the network server, or the network server may send a message to one or more registered telecommunications advertising that the first telecommunication device is requesting an invite to join an existing user network. For example, with reference to FIG. 5, device 504 in Level 4 of user network 520 may have registered with user network 520 as the result of a randomly generated invite from device 503 in Level 3.

In step 210, it is determined by a network server if the first telecommunication device received an invite. If an invite was not received, a network server may reinitiate the process of requesting a random invite in step 208 and the process may repeat until the first telecommunication device receives a random invite. Once the random invite is received, the user may use the first telecommunication device to register with the user network associated with the telecommunication device from which the random invite was generated in step 212. Thereafter, the first telecommunication device may be used to log in to the network in step 204.

Returning to step 206, in accordance with an alternative subroutine, the first telecommunication device or associated computer may be used to request an invite from a particular, i.e., non-random, other telecommunication device by visiting a personal page associated with the other telecommunication device in step 214. Once the personal page is visited, the first telecommunication device may request an invite from the telecommunication device associated with a particular user in step 216.

Figure 3:
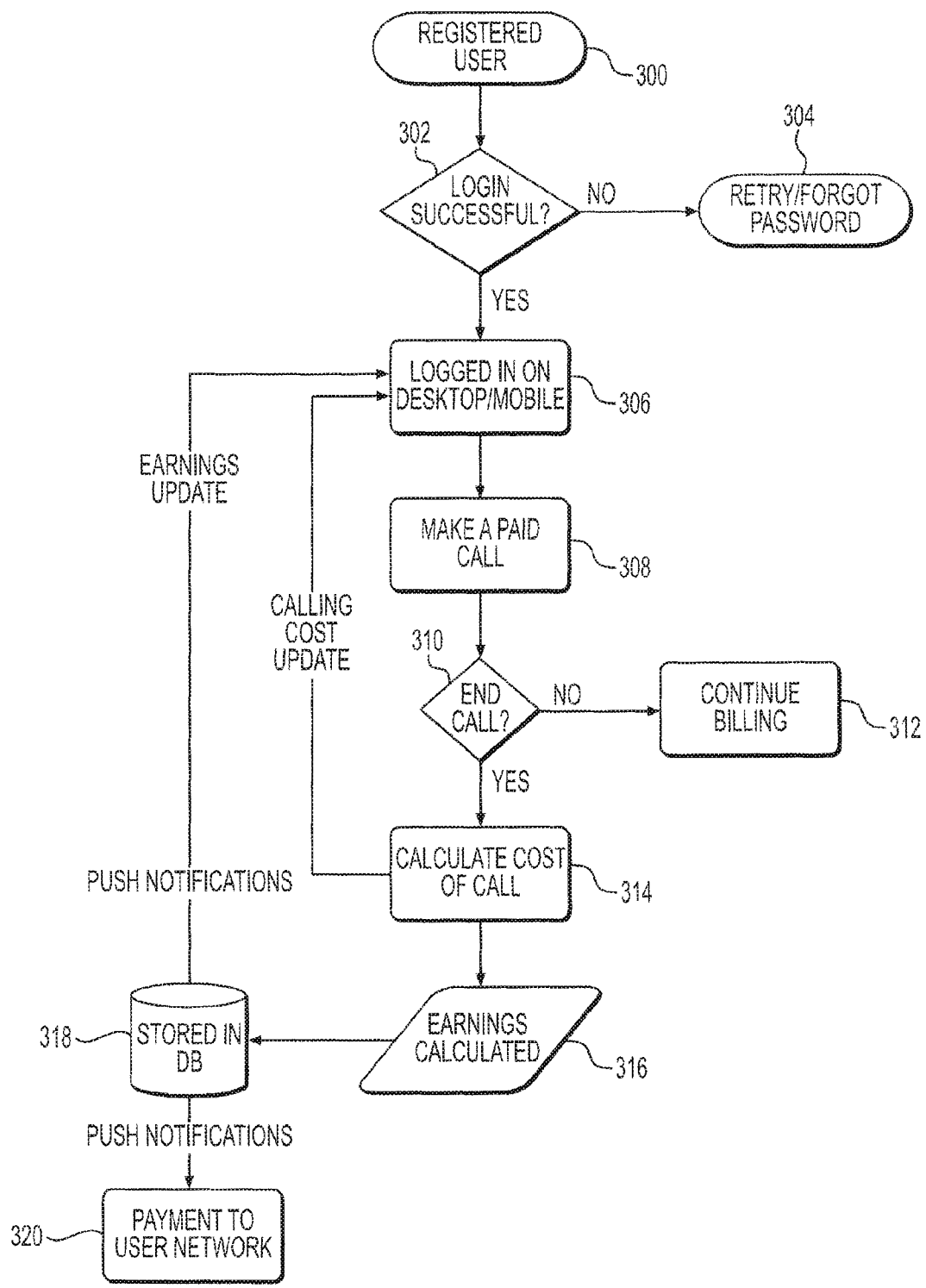
FIG. 3 is a schematic illustration of a method of determining an end user credit in accordance with a first embodiment of the present invention.

In step 210, it is determined by a network server if the first telecommunication device received an invite from the telecommunication device associated with the particular user. If an invite was not received, the first telecommunication device may reinitiate the process of requesting an invite from the telecommunication device associated with another particular user in step 214, and the process may repeat until the first telecommunication device receives an invite. Once an invite is received, the user may use the first telecommunication device to register with the user network associated with the telecommunication device from which the random invite was generated in step 212. Thereafter, the first telecommunication device may be used to log in to the network in step 204. With reference to FIG. 3, one or more accounts associated with telecommunication devices may earn end user credit to pay for the use of the accounts using the illustrated method. In the example illustrated in FIG. 3, end user credit may be earned as the result of the use of the telecommunication device to make a telephone call, however, it is appreciated that in alternative embodiments, credit may be earned as the result of use of a telecommunication device for other communication needs, such as for example transmission of text messages, photo images, video images, emails, etc. Taking an example in which first, second and third telecommunication devices are involved, in step 300, the first, second and third telecommunication devices must all be registered (see FIG. 2) such that there is a computer memory stored indicator of a hierarchical relationship between, in this example, the first and second telecommunication devices, and an indicator of a hierarchical relationship between the second and third telecommunication devices. In step 302, each of the telecommunication devices from which it is desired to earn end user credit must log in to the telecommunication network associated with the network server. Log in may be retried and passwords reset, as needed in step 304. In the present example, the second and third telecommunication devices are logged into the network and used to make telephone calls.

In step 306, once log in is successful, an application for making a telephone call may be accessed, automatically or manually, using the second telecommunication device and the third telecommunication device. In step 308, the second and third telecommunication devices may be used to place telephone calls over the telecommunication network associated with the network server to any other telecommunication devices, including, but not limited to each other. The placed calls may be calls for which there is normally a charge. If the calls are not ended in step 310, the network server may continue to accrue charges for the calls in step 312, for example on a second by second or minute by minute, basis.

If the calls are ended, the calculated cost of the calls may be determined in step 314 and calling cost updates may be transmitted to the second and third telecommunication devices (for their individual calls) and/or to the computers associated therewith. This may be done in real time to provide the callers with an indication of the cost of the calls.

In step 316, earnings for the user network of telecommunication devices which are hierarchically related to the second and third telecommunication devices may be calculated. With reference to FIG. 5, in the current example device 500 may constitute the first telecommunication device, device 502 may constitute the second telecommunication device, and device 504 may constitute the third telecommunication device. As a result, both the second and third telecommunication devices may have a hierarchical relationship with the first telecommunication device in which the first telecommunication device is higher in the hierarchy (Level 0 versus Level 1 and Level 4). Further, the second telecommunication device may have a hierarchical relationship with the third telecommunication device in which the second telecommunication device is higher in the hierarchy (Level 1 versus Level 4). As a result of the existence of these hierarchical relationships, the accounts associated with the telecommunication devices higher in the hierarchy may accrue earned end user credit as a result of the telecommunication device lower in the hierarchy using the telecommunication network to make a call. Further, the amount of the end user credit earned may be based on the number of levels separating the telecommunication devices in the hierarchical relationship.

For example, in step 316, it may be determined at a network server that a hierarchical relationship exists between the first and second telecommunication devices and that the first telecommunication device is higher in such hierarchy. Further, it may be determined at the network server that a hierarchical relationship exists between the first and third telecommunication devices and between the second and third telecommunication devices and that the first and second telecommunication devices are each higher in their respective hierarchies. An end user credit may be determined by computer for the first telecommunication device based at least in part on the indicator of the hierarchical relationship of the first and second telecommunication devices, based in part on the indicator of the hierarchical relationship of the first and third telecommunication devices, and based at least in part on the information concerning the use of the telecommunication network by the second and third telecommunication devices. Further, and end user credit may be determined by computer for the second telecommunication device based at least in part on the indicator of the hierarchical relationship of the second and third telecommunication devices, and based at least in part on the information concerning the use of the telecommunication network by the third telecommunication device.

The amount of end user credit earned for the account associated with the telecommunication device which is higher in the hierarchy may be dependent upon the number of levels separating the hierarchically higher telecommunication device from the hierarchically lower telecommunication device. For example, with reference to FIG. 6, in the example above, the first telecommunication device may earn a five percent (5%) credit of the charge for the call made by the second telecommunication device because the two devices are separated hierarchically by one level. Further, the first telecommunication device may earn a (0.625%) credit of the charge for the call made by the third telecommunication device because the two devices are separated hierarchically by four levels. Still further, in the above example, the second telecommunication device may earn a (1.25%) credit of the charge for the call made by the third telecommunication device because the two devices are separated hierarchically by three levels.

Figure 5:
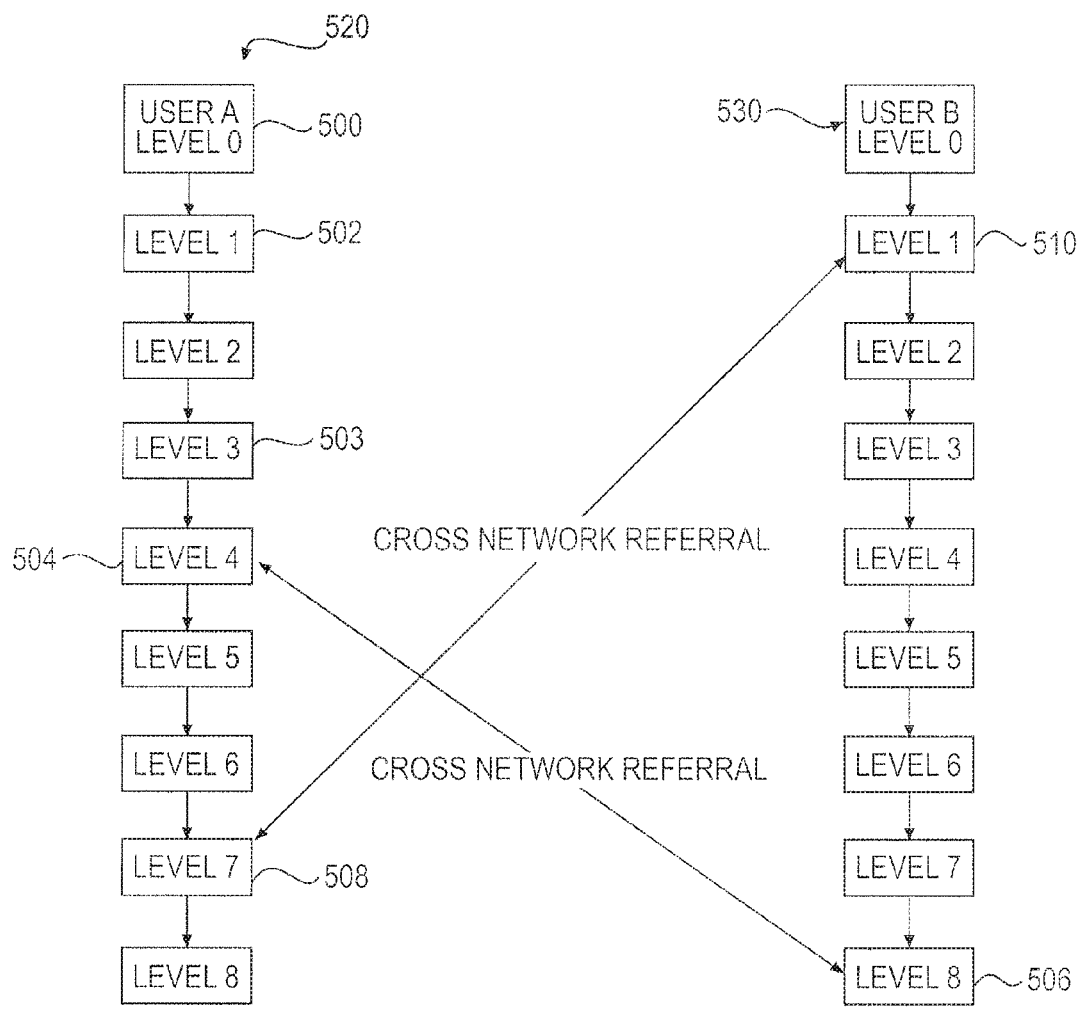
FIG. 5 is an illustration of hierarchical relationships between multiple telecommunication devices in accordance with embodiments of the invention.

Further, it should be noted that each level in the illustrated user networks in FIG. 5, such as user network 520, may have multiple telecommunication devices associated with each level that are hierarchically related to the telecommunication device above it in the hierarchy. For example, with respect to user network 520, there may be ten (10) telecommunication devices in Level 1 which are hierarchically one level below telecommunication device 500. There may be ten (10) telecommunication devices in Level 2 which are hierarchically one level below each telecommunication device in Level 1, for a total of one hundred (100) devices in Level 2 hierarchically related to telecommunication device 500 in Level 0. This pattern may be repeated such that there may be as many as 1,000 telecommunications devices in Level 3 related to telecommunication device 500 in Level 0, and so on.

In step 318, the determined end user credit may be stored in a database associated with the network server, and payments (or end user credits) may be "paid" to the accounts associated with the affected telecommunication devices in the user network. In this example, the payments or credits would be made to at least the accounts associated with the first and second telecommunication devices. Optionally, in step 318, the accounts associated with the second and third telecommunication devices may also receive earnings credit for use of the telecommunication network, however, these earnings are not related necessarily to any hierarchical relationship, but only to use of the telecommunication network.

The notification of payment or end user credit to the accounts associated with the first and second telecommunication devices may be physically provided by transmitting a signal to the first telecommunication device and/or other computer associated with the first telecommunication device based on the determined end user credit, said signal being adapted to produce a physically perceptible output of the determined end user credit, and by transmitting a signal to the second telecommunication device and/or other computer associated with the second telecommunication device based on the determined end user credit, said signal being adapted to produce a physically perceptible output of the determined end user credit.

Figure 4:
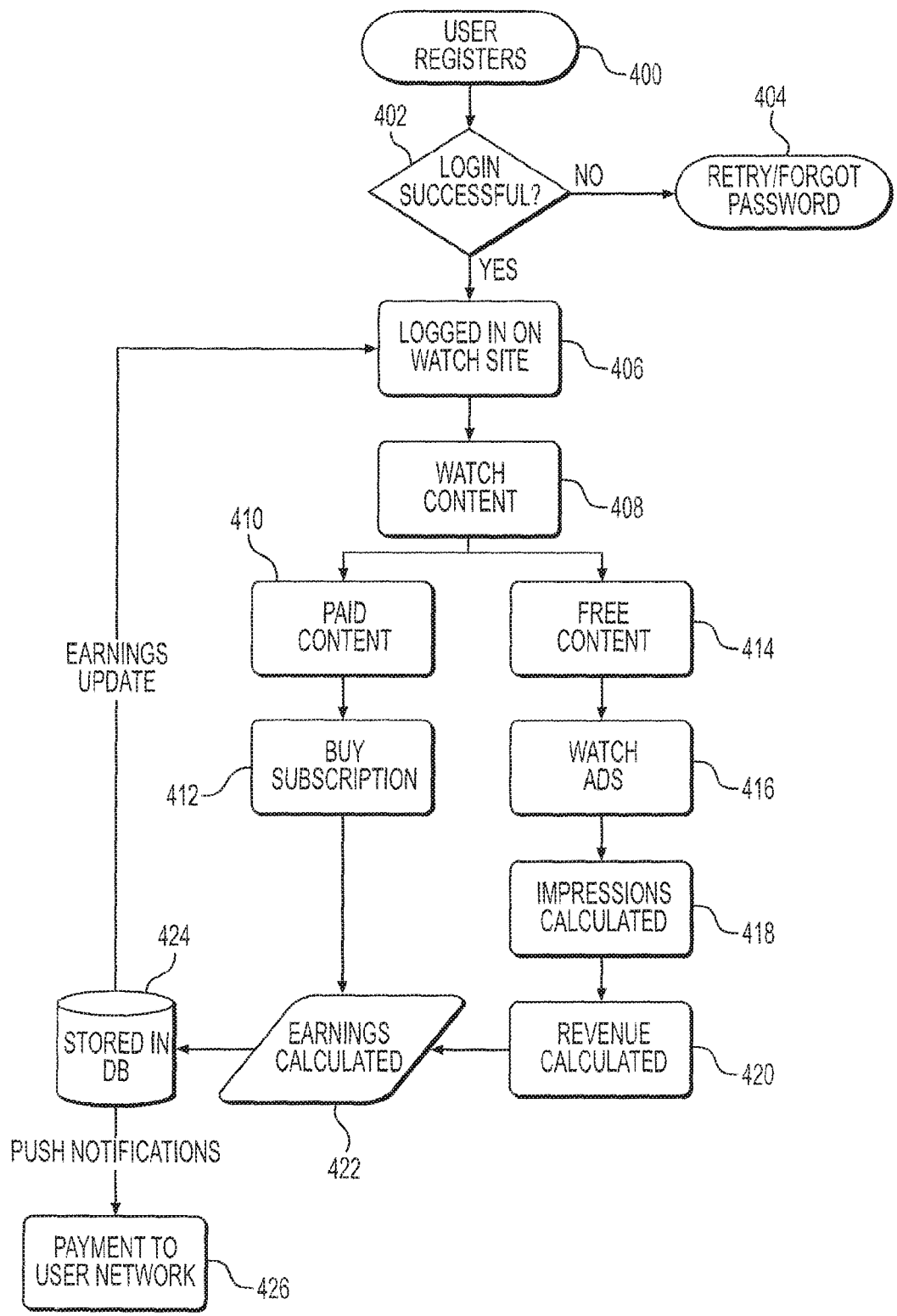
FIG. 4 is a schematic illustration of a method of determining an end user credit in accordance with a second embodiment of the present invention.

With reference to FIG. 4, one or more accounts associated with telecommunication devices may also, or alternatively, earn end user credit to pay for the use of the accounts using the illustrated method. In the example illustrated in FIG. 4, end user credit may be earned as the result of the use of the telecommunication device to view video or image content.

Taking an example in which first, second and third telecommunication devices are involved, in step 400, the first, second and third telecommunication devices must all be registered (see FIG. 2) such that there is a computer memory stored indicator of a hierarchical relationship between, in this example, the first and second telecommunication devices, and an indicator of a hierarchical relationship between the second and third telecommunication devices. In step 402, each of the telecommunication devices from which it is desired to earn end user credit must log in to the telecommunication network associated with the network server. Log in may be retried and passwords reset, as needed in step 404. In the present example, the second and third telecommunication devices are logged into the network and used to view video content.

In step 406, once log in is successful, an application for viewing content on a "Watch" website may be accessed, automatically or manually, using the second telecommunication device and the third telecommunication device. In step 408, one or more of the second and third telecommunication devices may be used to view the content using the telecommunication network associated with the network server. The use of the network may normally result in a charge to the accounts associated with the first, second and third telecommunication devices. If a charge is required to view the content (i.e., it is paid content), then in step 410, the network server may determine the charge to view the content and communicate the charge amount to the second and/or third telecommunication devices. If the charge is acceptable, the second and/or third telecommunication devices may be used to purchase access to view the content, such as, for example, by buying a subscription to do so in step 412. The calculated cost of the subscription may be transmitted to the second and/or third telecommunication devices and/or to the computers associated therewith. This may be done in real time to provide the viewers with an indication of the cost required to view the content.

As a result of purchasing a subscription, earnings for the user network of telecommunication devices which are hierarchically related to the second and third telecommunication devices may be calculated in step 422 as explained above in connection with FIGS. 3 and 5-6. Specifically, with reference to FIG. 5, in the current example device 500 may constitute the first telecommunication device, device 502 may constitute the second telecommunication device, and device 504 may constitute the third telecommunication device, which are all registered with the Watch telecommunication network. As a result, both the second and third telecommunication devices may have a hierarchical relationship with the first telecommunication device in which the first telecommunication device is higher in the hierarchy (Level 0 versus Level 1 and Level 4). Further, the second telecommunication device may have a hierarchical relationship with the third telecommunication device in which the second telecommunication device is higher in the hierarchy (Level 1 versus Level 4). As a result of the existence of these hierarchical relationships, the accounts associated with the telecommunication devices higher in the hierarchy may accrue earned end user credit as a result of the telecommunication device lower in the hierarchy using the telecommunication network to view content. Further, the amount of the end user credit earned may be based on the number of levels separating the telecommunication devices in the hierarchical relationship.

For example, in step 422, it may be determined at a network server that a hierarchical relationship exists between the first and second telecommunication devices and that the first telecommunication device is higher in such hierarchy. Further, it may be determined at the network server that a hierarchical relationship exists between the first and third telecommunication devices and between the second and third telecommunication devices and that the first and second telecommunication devices are each higher in their respective hierarchies. An end user credit may be determined by computer for the first telecommunication device based at least in part on the indicator of the hierarchical relationship of the first and second telecommunication devices, based in part on the indicator of the hierarchical relationship of the first and third telecommunication devices, and based at least in part on the information concerning the use of the telecommunication network by the second and third telecommunication devices. Further, and end user credit may be determined by computer for the second telecommunication device based at least in part on the indicator of the hierarchical relationship of the second and third telecommunication devices, and based at least in part on the information concerning the use of the telecommunication network by the third telecommunication device.

The amount of end user credit earned for the account associated with the telecommunication device which is higher in the hierarchy may be dependent upon the number of levels separating the hierarchically higher telecommunication device from the hierarchically lower telecommunication device. For example, with reference to FIG. 6, in the example above, the first telecommunication device may earn a ten percent (10%) credit of the charge to view the content by the second telecommunication device because the two devices are separated hierarchically by one level. Further, the first telecommunication device may earn a (1.25%) credit of the charge for viewing content on the third telecommunication device because the two devices are separated hierarchically by four levels. Still further, in the above example, the second telecommunication device may earn a (2.5%) credit of the charge for viewing content on the third telecommunication device because the two devices are separated hierarchically by three levels.

Further, it should be noted that each level in the illustrated user networks in FIG. 5, such as user network 520, may have multiple telecommunication devices associated with each level that are hierarchically related to the telecommunication device above it in the hierarchy, as explained above in connection with FIG. 3.

In step 424, the determined end user credit may be stored in a database associated with the network server, and payments (or end user credits) may be "paid" to the accounts associated with the affected telecommunication devices in the user network in step 426. In this example, the payments or credits would be made to at least the accounts associated with the first and second telecommunication devices.

The notification of payment or end user credit to the accounts associated with the first and second telecommunication devices may be physically provided by transmitting a signal to the first telecommunication device and/or other computer associated with the first telecommunication device based on the determined end user credit, said signal being adapted to produce a physically perceptible output of the determined end user credit, and by transmitting a signal to the second telecommunication device and/or other computer associated with the second telecommunication device based on the determined end user credit, said signal being adapted to produce a physically perceptible output of the determined end user credit.

Alternatively, following step 408, in step 414 it may be determined that the content which is to be viewed will be provided free of charge if the telecommunication device is also used to view one or more advertisements in step 416. Once the advertisement has been viewed in step 416, the second and third telecommunication devices may be used to submit responses which relate to the advertisement and/or viewed content. Impressions of the viewed advertisement and/or content may be calculated in step 418 and revenue generated for the telecommunication network, as a result of viewing the content and/or advertisement, may be calculated in step 420. Thereafter, the calculation of earnings in step 422, as described above, may be further modified to be based in part on the revenue generated in step 420.

As discussed above, the present invention is not limited to a device resembling the particular telecommunication device described above. In particular, the invention may be implemented in other types of devices and using other types of input and output mechanisms. In addition, the above-described techniques can be used in connection with any type of information or communication mode associated with a contact, including, for example, SMS addresses or handles, email addresses, presence information, and the like. Moreover, the above-described techniques can be used in connection with a group call when the caller calls one or more than one recipient.

The present invention also relates to an apparatus for performing the operations herein. The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. The required structure for a variety of these systems appears from the description. In addition, the present invention is not described with reference to any particular programming language. It will be appreciated that a variety of programming languages may be used to implement the teachings of the invention as described herein.

As will be understood by those skilled in the art, the invention may be embodied in other specific forms without departing from the spirit or essential characteristics thereof. For example, the particular architecture depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. In addition, the present invention may be implemented as a method, process, user interface, computer program product, system, apparatus, or any combination thereof. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. A method for improving telecommunication network operational efficiency for a telecommunication network connecting a server and client side telecommunication devices, the method comprising:
    providing a server to communicate with first and second telecommunication devices;
    registering the first and second telecommunication devices with the server;
    determining, at the server, a hierarchical relationship between the first and second telecommunication devices, wherein the hierarchical relationship resulted from the acceptance of an invite to establish the hierarchical relationship and wherein the invite was transmitted between the first and second telecommunication devices independent of use of the telecommunication network for a purpose other than to transmit the invite;
    storing, in a computer memory associated with the server, an indicator of the hierarchical relationship of the first and second telecommunication devices;
    storing, in the computer memory, information concerning use of the telecommunication network by the second telecommunication device;
    determining an end user credit for the first telecommunication device based at least in part on the indicator of the hierarchical relationship of the first and second telecommunication devices, and based at least in part on the information concerning the use of the telecommunication network by the second telecommunication device; and
    transmitting a signal to the first telecommunication device or other computer associated with the first telecommunication device based on the determined end user credit, said signal being adapted to produce a physically perceptible output of the determined end user credit.

2. The method of claim 1, further comprising the step of displaying the physically perceptible output of the determined end user credit at the first telecommunication device and/or other computer associated with the first telecommunication device.

3. The method of claim 1, further comprising the steps of:
    determining an end user credit for the second telecommunication device based at least in part on the information concerning the use of the telecommunication network by the second telecommunication device; and
    transmitting a signal to the second telecommunication device and/or other computer associated with the second telecommunication device based on the determined end user credit for the second telecommunication device, said signal being adapted to produce a physically perceptible output of the determined end user credit.

4. The method of claim 1 wherein the output of the determined end user credit represents virtual currency.

5. The method of claim 1 wherein the output of the determined end user credit represents actual currency.

6. The method of claim 1 wherein the information concerns use of the telecommunication network for telephone calls.

7. The method of claim 1 wherein the information concerns use of the telecommunication network for text or SMS messages.

8. The method of claim 1 wherein the information concerns use of the telecommunication network for email messages.

9. The method of claim 1 wherein the information concerns use of the telecommunication network for instant messages.

10. The method of claim 1 wherein the information concerns use of the telecommunication network to download video information.

11. The method of claim 1 wherein the information concerns use of the telecommunication network to access the Internet.

12. The method of claim 1 wherein the end user credit for the first telecommunication device is applied in real time to reduce charges associated with use of the first telecommunication device.

13. A method for improving telecommunication network operational efficiency for a telecommunication network connecting a server and client side telecommunication devices, the method comprising:
    providing a server to communicate with first, second and third telecommunication devices;
    registering the first, second and third telecommunication devices with the server;
    determining, at the server, a first hierarchical relationship between the first and second telecommunication devices, wherein the first hierarchical relationship resulted from the acceptance of an invite to establish the first hierarchical relationship and wherein the invite was transmitted between the first and second telecommunication devices independent of use of the telecommunication network for a purpose other than to transmit the invite;
    determining, at the server, a second hierarchical relationship between the second and third telecommunication devices, wherein the second hierarchical relationship resulted from the acceptance of an invite to establish the second hierarchical relationship and wherein the invite was transmitted between the second and third telecommunication devices independent of use of the telecommunication network for a purpose other than to transmit the invite;

storing, in a computer memory associated with the server, an indicator of the first hierarchical relationship of the first and second telecommunication devices and an indicator of the second hierarchical relationship of the second and third telecommunication devices;

storing, in the computer memory, information concerning use of the telecommunication network by the third telecommunication device;

determining an end user credit for the first telecommunication device based at least in part on the indicator of the first hierarchical relationship of the first and second telecommunication devices, based at least in part on the indicator of the second hierarchical relationship of the second and third telecommunication devices, and based at least in part on the information concerning the use of the telecommunication network by the third telecommunication device; and transmitting a signal to the first telecommunication device or other computer associated with the first telecommunication device based on the determined end user credit, said signal being adapted to produce a physically perceptible output of the determined end user credit.

14. A method for improving telecommunication network operational efficiency for a telecommunication network connecting a server and client side telecommunication devices, the method comprising:

providing a server to communicate with first, second and third telecommunication devices;

registering the first, second and third telecommunication devices with the server;

determining, at the server, a hierarchical relationship between the first and second telecommunication devices;

determining, at the server, a hierarchical relationship between the second and third telecommunication devices;

storing, in a computer memory associated with the server, an indicator of the hierarchical relationship of the first and second telecommunication devices and an indicator of the hierarchical relationship of the second and third telecommunication devices;

storing, in the computer memory, information concerning use of the telecommunication network by the third telecommunication device;

determining an end user credit for the first telecommunication device based at least in part on the indicator of the hierarchical relationship of the first and second telecommunication devices, based at least in part on the indicator of the hierarchical relationship of the second and third telecommunication devices, and based at least in part on the information concerning the use of the telecommunication network by the third telecommunication device;

transmitting a signal to the first telecommunication device or other computer associated with the first telecommunication device based on the determined end user credit, said signal being adapted to produce a physically perceptible output of the determined end user credit;

determining an end user credit for the second telecommunication device based at least in part on the indicator of the hierarchical relationship of the second and third telecommunication devices, and based at least in part on the information concerning the use of the telecommunication network by the third telecommunication device; and transmitting a signal to the second telecommunication device and/or other computer associated with the second telecommunication device based on the determined end user credit, said signal being adapted to produce a physically perceptible output of the determined end user credit.

15. The method of claim 14 wherein the end user credit for the second telecommunication device is greater than the end user credit for the first telecommunication device.

16. The method of claim 14 wherein the end user credit for the second telecommunication device is different than the end user credit for the first telecommunication device.

17. The method of claim 14, further comprising the step of displaying the physically perceptible output of the determined end user credit at the first telecommunication device and/or other computer associated with the first telecommunication device.

18. The method of claim 14, further comprising the steps of:

determining an end user credit for the third telecommunication device based at least in part on the information concerning the use of the telecommunication network by the third telecommunication device; and transmitting a signal to the third telecommunication device and/or other computer associated with the third telecommunication device based on the determined end user credit for the third telecommunication device, said signal being adapted to produce a physically perceptible output of the determined end user credit.

19. The method of claim 14 wherein the hierarchical relationship of the first and second telecommunication devices results from an invitation relationship between the first and second telecommunication devices, and wherein the hierarchical relationship of the second and third telecommunication devices results from an invitation relationship between the second and third telecommunication devices.

20. The method of claim 14 wherein the information concerns use of the telecommunication network for telephone calls.

21. The method of claim 14 wherein the information concerns use of the telecommunication network for text or SMS messages.

22. The method of claim 14 wherein the information concerns use of the telecommunication network for email messages.

23. The method of claim 14 wherein the information concerns use of the telecommunication network for instant messages.

24. The method of claim 14 wherein the information concerns use of the telecommunication network to download video information.

25. The method of claim 14 wherein the information concerns use of the telecommunication network to access the Internet.

26. The method of claim 14 wherein the end user credit for the first telecommunication device is applied in real time to reduce charges associated with use of the first telecommunication device.

27. A system for improving telecommunication network operational efficiency for a telecommunication network connecting a server and client side telecommunication devices, the system comprising:
- a server adapted to communicate with first and second telecommunication devices; and
- first and second telecommunication devices registered with the server;
- a computer memory associated with the server;
- means for determining a hierarchical relationship between the first and second telecommunication devices and determining an end user credit for the first telecommunication device based at least in part on the indicator of the hierarchical relationship of the first and second telecommunication devices, and based at least in part on the information concerning the use of the telecommunication network by the second telecommunication device; and
- means for transmitting a signal to the first telecommunication device or other computer associated with the first telecommunication device based on the determined end user credit, said signal being adapted to produce a physically perceptible output of the determined end user credit, wherein the hierarchical relationship resulted from the acceptance of an invite to establish the hierarchical relationship and wherein the invite was transmitted between the first and second telecommunication devices independent of use of the telecommunication network for a purpose other than to transmit the invite.

28. A system for improving telecommunication network operational efficiency for a telecommunication network connecting a server and client side telecommunication devices, the system comprising:
- a server adapted to communicate with first, second and third telecommunication devices;
- first, second and third telecommunication devices registered with the server;
- a computer memory associated with the server;
- means for determining a hierarchical relationship between the first and second telecommunication devices, and a hierarchical relationship between the second and third telecommunication devices and determining an end user credit for the first telecommunication device based at least in part on the indicator of the hierarchical relationship of the first and second telecommunication devices, based at least in part on the indicator of the hierarchical relationship of the second and third telecommunication devices, and based at least in part on the information concerning the use of the telecommunication network by the third telecommunication device; and
- means for transmitting a signal to the first telecommunication device or other computer associated with the first telecommunication device based on the determined end user credit, said signal being adapted to produce a physically perceptible output of the determined end user credit.

29. The system of claim 28, wherein the means for determining further comprises means for determining an end user credit for the second telecommunication device based at least in part on the indicator of the hierarchical relationship of the second and third telecommunication devices, and based at least in part on the information concerning the use of the telecommunication network by the third telecommunication device.

30. The system of claim 29, wherein the end user credit for the second telecommunication device is greater than the end user credit for the first telecommunication device.

31. The system of claim 29 wherein the end user credit for the second telecommunication device is different than the end user credit for the first telecommunication device.

32. The method of claim 28, wherein the first telecommunication device further comprises means for displaying the physically perceptible output of the determined end user credit.

* * * * *